United States Patent Office 2,950,082
Patented Aug. 23, 1960

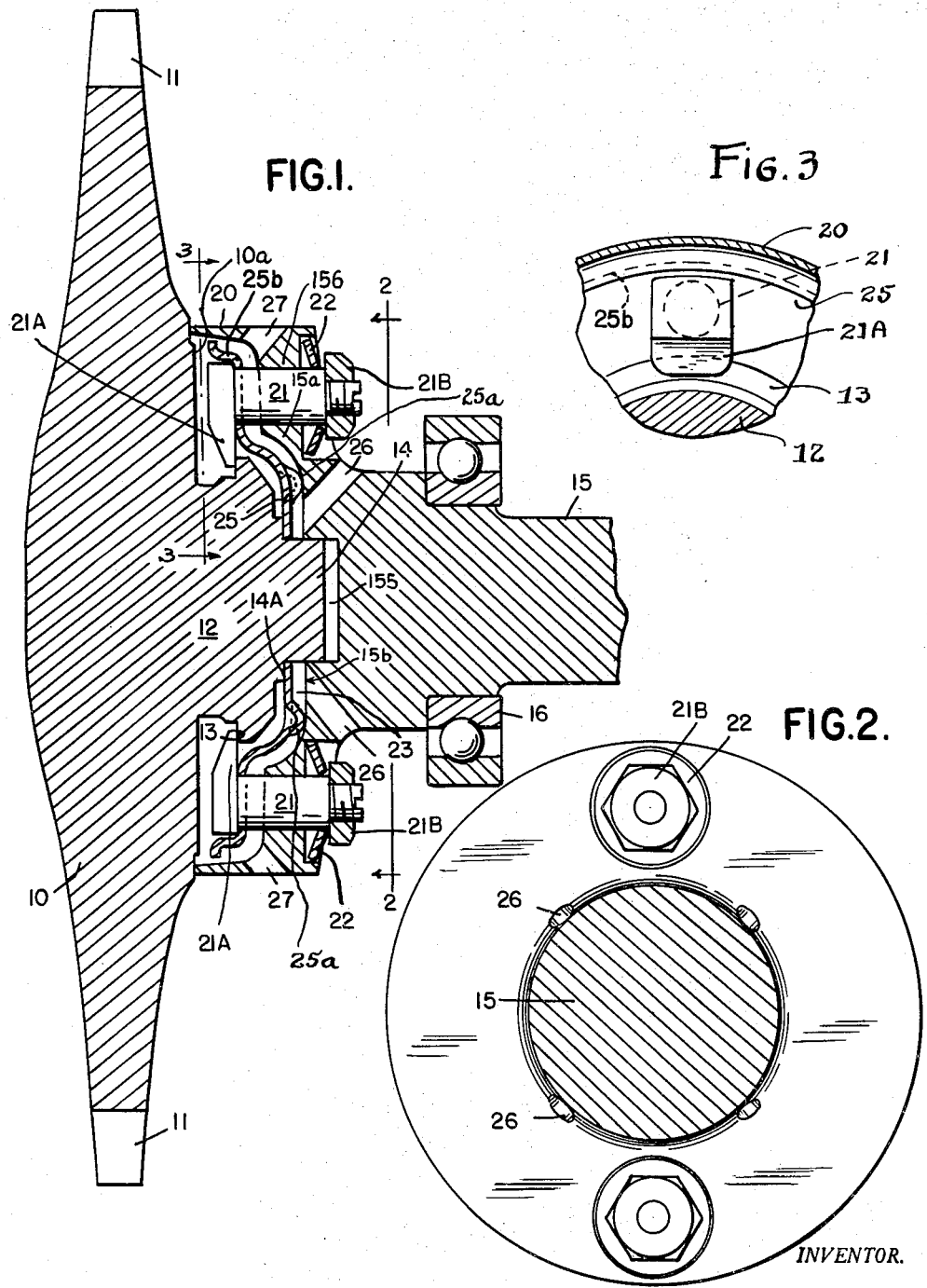

2,950,082
TURBINE WHEEL ASSEMBLY
John R. McVeigh, 160 Farber Lane, Williamsville, N.Y.
Filed Apr. 18, 1955, Ser. No. 501,999
13 Claims. (Cl. 253—39.15)

The present invention relates to a turbine wheel assembly in which a turbine wheel or impeller is mounted upon a shaft to be driven thereby. Specifically the invention relates to the mounting of an impeller or wheel which, under conditions of use, attains a high temperature but which is mounted upon a shaft on which such high temperatures will have a deleterious effect for several reasons. It also relates to the mounting of a turbine wheel or impeller made of such hard materials as cemented titanium carbide which is difficult or impossible to machine, upon a steel shaft. Such materials as these, having such widely differing degrees or amounts of expansion under heating, increase the difficulties of such mounting.

It is among the objects of the present invention to provide mounting means for such turbine wheels that will require no finishing machining for the wheels.

Another object is to provide means that will largely overcome the difficulties due to the differences in expansion under heating.

Still another object is to provide means for largely preventing or at least greatly diminishing the transfer of heat from the wheel to the shaft under conditions of use.

With these and other objects in mind, reference is hereby made to the following description and the accompanying drawings in which—

Figure 1 is a central longitudinal sectional view through a turbine wheel-shaft assembly embodying the invention.

Figure 2 is a section on line 2—2 of Figure 1.

Figure 3 is a fragmentary detail view of the bolt assembly taken on the line 3—3 of Figure 1.

In the drawings, a turbine wheel or impeller is shown at 10 and is indicated as having a central or hub portion of considerable thickness which is generally the shape used. This central portion may be formed with arms upon which the blades are mounted or as a lenticular disc with blades 11 at the periphery. The exact form of the wheel is immaterial except as is hereinafter noted.

One face of the disc 10 is provided at the center with an accurately located axially extending hub portion 12, having a circumferential shoulder 13 axially spaced from the disc 10 proper and disposed substantially parallel with and facing the mounting face 10a of wheel 10, and also having at its end a cylindrical rearwardly extending protrusion 14 which acts as a pilot in a suitable pilot recess or hole 15S in the shaft 15. This formation of the disc may, in the case of titanium carbide, be made before sintering to produce the completed wheel. The shaft 15 upon which the wheel is to be mounted is provided with means for cooperating with a suitable bearing 16 and is flanged as shown at 15a.

The flange 15a is hollowed out to provide at its outer edge a relatively thin axially extending peripheral wall 20 so that at this point the area of contact between the flange and the mounting face 10a of the wheel is small. Near the wall 20 and located radially inwardly thereof are openings 15b for the passage of two or more bolts 21. These bolts are of the type having a laterally projecting lug or nose 21A, which coact with the shoulder 13 of wheel hub 12 to clamp the wheel against the annular peripheral rim of wall 20. It is preferred to use in connection with the bolts 21 and their coacting nuts 21B, Belleville washers 22 or other suitable types of resilient washers in order to provide a small amount of resiliency in the connection.

In providing the hollowed out structure of the flange, a sufficient size hollow or recess is provided to allow a relatively large chamber or recess 23 between the radially extending end flange surface 15b of the shaft and the adjacent wheel mounting surface 10a and in this chamber is disposed a thin metal shield 25 in the form of an annulus, the central opening of which fits around the pilot 14 and the outer edge of which is closely adjacent the inner cylindrical surface of the thin peripheral wall 20, suitable holes of course being provided for the passage of bolts 21. Two or more dimples or projections 25a may be provided to suitably space the shield from the surface 15b of the recessed flange 15a of the shaft 15. The shield 25 is provided with an axially extending portion 25b which lies closely adjacent the bolt lug 21a to prevent rotation of the bolt 21 on assembly, keeping the lug engaged with the shoulder 13.

A shoulder 14A around the pilot 14 and against which the shield lies should be of such radial dimension as to space the shield in the chamber 23 out of contact for the most part with respect to the walls 15b and 10a of the chamber 23. This construction provides a considerable air space between the shield 25 and the adjacent end face 15b of the shaft flange 15a, and opening into this space are the passages 26 and 27 for facilitating the passage of cooling air through the chamber 23.

The passages 26 extend diagonally inward to open the chamber as near the axis of the shaft as possible. This is, of course, adjacent the pilot 14. The passages 27 are arranged in the wall 20 and terminate at the outer periphery of the flange.

With this arrangement of chamber and passages, a considerable flow of air through the chamber 23 and over the surface of shield 25 will be attained through centrifugal action and a large amount of the heat, which would otherwise flow to the shaft flange, is dissipated. It is noted that the thin peripheral wall 20 extends axially and encloses the air chamber or recess 23 bounded at the front by wheel 10, to the rear by the end face 15b of the flange 15a of the shaft 15 and inwardly by the hub 12 of the wheel. The bolts 21 are located radially inwardly of the wall 20 and radially outwardly of the wheel hub 12.

I claim:

1. A turbine wheel and shaft assembly comprising a wheel provided with a hub axially extending from one face thereof, said hub having a radially outwardly extending shoulder axially spaced from said wheel face, and a shaft provided with a flange recessed to receive said hub, said recess being of sufficient size to provide an air chamber between said wheel and flange, said flange having a peripheral edge means carried by said flange and coacting with said shoulder to fix the wheel and flange together with the peripheral edge of said flange contacting said wheel, said flange having means for causing a flow of air through said chamber, and means disposed in said chamber for shielding said air from contact with the wheel surface.

2. A turbine wheel and shaft assembly comprising a shaft having a wheel pilot recess and terminating in a substantially radially extending flange provided with an axial recess and a wheel adapted to be secured to the end of the shaft and having a mounting face, a hub extending centrally axially into the axial recess of said flange and piloted in the wheel pilot recess of said shaft, said flange having a relatively thin peripheral axially extending wall provided with an annular rim located radially outwardly from said flange recess and contacting said wheel mounting face and thereby spacing the inner surface of said flange recess from said wheel mounting face to form an annular air chamber about said wheel hub, and means coacting between said hub and said flange to secure the turbine wheel to the shaft and to locate said hub in the flange recess, and a substantially radially extending shield member disposed in said air chamber intermediate and spaced for the most part from said wheel mounting face and the radially extending portion of said flange, and said assembly having means for inducing air flow substantially between said shield member and said flange.

3. A turbine assembly comprising a shaft having a wheel pilot recess and a turbine wheel having a mounting face adapted to be secured to the end of said shaft, said wheel having a hub piloted in the wheel pilot recess of said shaft, said shaft end having a substantially radially extending flange provided with an axial recess and a relatively thin peripheral wall having an annular rim and extending axially and located radially outwardly from said flange recess, said flange having a radially extending end surface facing said wheel and bounding the radially extending inner end of said recess, said wall arranged to abut said wheel mounting face and mounting means carried by the flange and located within said flange recess radially inwardly of the said wall and operably engaged with said wheel to pull said wheel mounting face against the forward annular rim of said wall and thereby spacing said wheel face from the radially extending surface of said flange facing said wheel and cooperating with the thin peripheral wall and wheel hub to provide an annular air chamber therebetween.

4. A turbine assembly comprising a shaft having a wheel pilot recess and a turbine wheel having a mounting face adapted to be secured to the end of said shaft, said wheel having a hub piloted in the wheel pilot recess of said shaft, said shaft end having a substantially radially extending flange provided with an axial recess and a relatively thin peripheral wall having an annular rim and extending axially and located radially outwardly from said rim of the flange recess, said flange having a radially extending end surface facing said wheel and bounding the radially extending inner end of said recess, said wall arranged to abut said wheel mounting face and mounting means carried by the flange and extending within said flange recess radially inwardly of the said wall and operably engaged with said wheel to pull said wheel mounting face against the forward annular rim of said wall and thereby spacing said wheel face from the radially extending surface of said flange facing said wheel and cooperating with the thin peripheral wall and wheel hub to provide an annular air chamber therebetween, and said flange having means for producing a flow of air through said chamber.

5. A turbine assembly comprising a shaft having a wheel pilot recess and a turbine wheel having a mounting face adapted to be secured to the end of said shaft, said wheel having a hub piloted in the wheel pilot recess of said shaft, said shaft end having a substantially radially extending flange provided with an axial recess and a relatively thin peripheral wall having an annular rim and extending axially and located radially outwardly from said flange recess, said flange having a radially extending end surface facing said wheel and bounding the radially extending inner end of said recess, said rim of the wall adapted to abut said wheel mounting face, said wheel hub constructed and arranged to extend axially into said flange recess and provided with a radially extending flange having an annular circumferential shoulder facing and axially spaced from said wheel mounting face, said hub being substantially radially inwardly spaced from said flange wall and said wheel mounting face being axially spaced from the radially extending surface of said flange recess to provide an annular air chamber, and mounting means carried by said flange and having means operably coacting with said hub flange shoulder to pull said wheel mounting face against the annular peripheral rim of said wall, and thereby spacing said wheel mounting face from the radially extending surface of said flange recess.

6. A turbine assembly comprising a shaft having a wheel pilot recess and a turbine wheel having a mounting face adapted to be secured to the end of said shaft, said wheel having a hub piloted in the wheel pilot recess of said shaft, said shaft end having a substantially radially extending flange provided with an axial recess and a relatively thin peripheral wall having an annular rim and extending axially and located radially outwardly from said flange recess, said flange having a radially extending end surface facing said wheel and bounding the radially extending inner end of said recess, the annular rim of said wall adapted to abut said wheel mounting face, said wheel hub constructed and arranged to extend axially into said flange recess and provided with a radially extending flange having an annular circumferential shoulder facing and axially spaced from said wheel mounting face, said hub being substantially radially inwardly spaced from said flange wall and said wheel mounting face being axially spaced from the radially extending inner surface of said flange recess to provide an annular air chamber, and mounting means carried by said flange and having means operably coacting with said hub flange shoulder to pull said wheel mounting face against the annular peripheral rim of said wall, and thereby spacing said wheel mounting face from the radially extending surface of said flange recess, a relatively thin substantially radially extending sheet metal shield member carried in said chamber and substantially spaced from said wheel mounting face and from the radially extending surface of said flange recess, and said shaft flange having means for producing a flow of air between said shield and the inner surface of said recess.

7. A turbine assembly comprising a shaft having a wheel pilot recess and a turbine wheel having a mounting face adapted to be secured to the end of said shaft, said wheel having a hub piloted in the wheel pilot recess of said shaft, said shaft end having a substantially radially extending flange provided with an axial recess and a relatively thin peripheral wall having an annular rim and extending axially and located radially outwardly from said flange recess, said flange having a radially extending end surface facing said wheel and bounding the radially extending inner end of said recess, the annular rim of said wall adapted to abut said wheel mounting face, said wheel hub constructed and arranged to extend axially into said flange recess and provided with a radially extending flange having an annular circumferential shoulder facing and axially spaced from said wheel mounting face, said hub being substantially radially inwardly spaced from said flange wall and said wheel mounting face being axially spaced from the radially extending inner surface of said flange recess to provide an annular air chamber, and mounting means carried by said flange and having means operably coacting with said hub flange shoulder to pull said wheel mounting face against the annular peripheral rim of said wall and thereby spacing said wheel mounting face from the radially extending inner surface of said flange recess, a relatively thin substantially radially extending sheet metal shield member carried in said chamber and substantially spaced from said wheel mounting face and from the aforesaid radially extending inner surface of said flange recess, and said shaft flange having means for producing a flow of air between said shield and the inner surface of said recess, said shaft wheel pilot recess extending inwardly further than the first mentioned flange recess and adapted to receive the outer end of said hub pilot portion for centering said wheel with respect to said shaft.

8. A turbine assembly comprising a shaft having a wheel pilot recess and a turbine wheel having a mounting face adapted to be secured to the end of said shaft, said wheel having a hub piloted in the wheel pilot recess of said shaft, said shaft end having a substantially radially extending flange provided with an axial recess and a relatively thin peripheral wall extending axially and located radially outwardly from said flange recess, said flange having a radially extending end surface facing said wheel and bounding the radially extending inner end of said recess, said wall having an annular rim adapted to abut said wheel mounting face, said wheel hub constructed and arranged to extend axially into said flange recess and provided with a radially extending flange having an annular circumferential shoulder facing and axially spaced from said wheel mounting face, said hub being substantially radially inwardly spaced from said flange wall and said wheel mounting face being axially spaced from the radially extending inner surface of said flange recess to provide an annular air chamber, and mounting means carried by said flange and having means operably coacting with said hub flange shoulder to pull said wheel mounting face against the annular peripheral rim of said wall, and thereby spacing said wheel mounting face from the radially extending inner surface of said flange recess, a relatively thin substantially radially extending sheet metal shield member carried in said chamber and substantially spaced from said wheel mounting face and from the radially extending inner surface of said flange recess, and said shaft flange having means for producing a flow of air between said shield and the inner surface of said recess, said wheel hub having a central pilot portion extending axially from said hub flange, said shaft pilot recess extending radially inwardly further than the first mentioned flange recess and adapted to receive the hub pilot portion for centering said wheel with respect to said shaft, said shield member having a central hole and adapted to be carried and centered on said hub pilot portion, said mounting means constructed and arranged to secure said shield member in fixed position relative to said shaft flange.

9. A turbine assembly comprising a shaft having a wheel pilot recess and a turbine wheel having a mounting face adapted to be secured to the end of said shaft, said wheel having a hub piloted in the wheel pilot recess of said shaft, said shaft end having a substantially radially extending flange provided with an axial recess and a relatively thin peripheral wall having an annular rim extending axially and located radially outwardly from said flange recess, said flange having a radially extending end surface facing said wheel and bounding the radially extending inner end of said recess, said wall adapted to abut said wheel mounting face, said wheel hub constructed and arranged to extend axially into said flange recess and provided with a radially extending flange having an annular circumferential shoulder facing and axially spaced from said wheel mounting face, said hub being substantially inwardly radially spaced from said flange wall and said wheel mounting face being axially spaced from the radially extending inner surface of said flange recess to provide an annular air chamber, and mounting means carried by said flange and having means operably coacting with said hub flange shoulder to pull said wheel mounting face against the annular peripheral rim of said wall and thereby spacing said wheel mounting face from the radially extending inner surface of said flange recess, a relatively thin substantially radially extending sheet metal shield member carried in said chamber and substantially spaced from said wheel mounting face and from the radially extending inner surface of said flange recess, said wheel hub pilot portion extending axially from said hub flange, said shaft wheel pilot recess extending inwardly further than the first mentioned flange recess and adapted to receive the outer end of said hub pilot portion for centering said wheel with respect to said shaft, said shaft flange having a plurality of annularly spaced air passages adjacent said peripheral wall and a plurality of annularly spaced air passages radially inwardly spaced from said first mentioned air passages, all of said air passages opening into the air chamber on that side of said shield adjacent the flange and remote from said wheel mounting face.

10. A turbine assembly comprising a shaft having a wheel pilot recess and a turbine wheel having a mounting face adapted to be secured to the end of said shaft, said wheel having a hub piloted in the wheel pilot recess of said shaft, said shaft end having a substantially radially extending flange provided with an axial flange recess and a relatively thin peripheral wall extending axially and located radially outwardly from said flange recess, said flange having a radially extending end surface facing said wheel and bounding the radially extending inner end of said recess, said wall having an annular rim adapted to abut said wheel mounting face, said wheel hub constructed and arranged to axially extend into said flange recess and provided with an outwardly radially extending flange having an annular circumferential shoulder facing and axially spaced from said wheel mounting face, said hub being substantially radially spaced from said thin peripheral flange wall and said wheel mounting face being axially spaced from the inwardly radially extending inner surface of said flange recess to provide an annular air chamber, and mounting means carried by said flange and comprising a plurality of annularly spaced bolts extending through the flange and into said chamber, the heads of said bolts being engaged with said hub flange shoulder, and nuts disposed on said bolts exteriorly of said flange recess and arranged to engage with said flange and be tightened thereon for pulling said wheel mounting face against the annular peripheral rim of said flange wall and thereby spacing said wheel mounting face from the radially extending inner surface of said flange recess.

11. A turbine assembly comprising a shaft having a wheel pilot recess and a turbine wheel having a mounting face adapted to be secured to the end of said shaft, said wheel having a hub piloted in the wheel pilot recess of said shaft, said shaft end having a substantially radially extending flange provided with an axial flange recess and a relatively thin peripheral wall extending axially and located radially outwardly from said flange recess, said flange having a radially extending end surface facing said wheel and bounding the radially extending inner end of said recess, said wall having an annular rim adapted to abut said wheel mounting face, said wheel hub constructed and arranged to axially extend into said flange recess and provided with an outwardly radially extending flange having an annular circumferential shoulder facing and axially spaced from said wheel mounting face, said hub being substantially inwardly radially spaced from said thin peripheral flange wall and said mounting face being axially spaced from the radially extending inner surface of said flange recess to provide an annular air chamber, and mounting means carried by said flange and comprising a plurality of annularly spaced bolts extending through the flange and into said chamber, the heads of said bolts being engaged with said hub flange shoulder, and nuts disposed on said bolts exteriorly of said flange recess and arranged to engage with said flange and be tightened thereon for pulling said wheel mounting face against the annular peripheral rim of said flange wall and thereby spacing said wheel mounting face from the inner surface of said flange recess, a relatively thin substantially radially extending sheet metal shield member carried in said chamber and substantially spaced from said wheel mounting face and from the radially extending inner surface of said flange recess, said bolts engaging with said shield member to secure same in fixed position relative to said shaft flange, said shield member coacting with said bolts to lock same against rotation and thereby prevent disengagement of same from said hub flange shoulder.

12. A turbine assembly comprising a shaft having a wheel pilot recess and a turbine wheel having a mounting face adapted to be secured to the end of said shaft, said wheel having a hub piloted in the wheel pilot recess of said shaft, said shaft end having a substantially radially extending flange provided with an axial flange recess and a relatively thin peripheral wall extending axially and located radially outwardly from said flange recess, said flange having a radially extending end surface facing said wheel and bounding the radially extending inner end of said recess said wall having an annular rim adapted to abut said wheel mounting face, said wheel hub constructed and arranged to axially extend into said flange recess and provided with an outwardly radially extending flange having an annular circumferential shoulder facing and axially spaced from said wheel mounting face, said hub being substantially inwardly radially spaced from said flange wall and said mounting face being axially spaced from the radially extending inner surface of said flange recess to provide an annular air chamber, and mounting means carried by said flange and comprising a plurality of annularly spaced bolts extending through the flange and into said chamber, the heads of said bolts being engaged with said hub flange shoulder, and nuts disposed on said bolts exteriorly of said flange recess and arranged to engage with said flange and be tightened thereon for pulling said wheel mounting face against the annular peripheral rim of said flange wall and thereby spacing said wheel face from the inner surface of said flange recess, a relatively thin substantially radially extending sheet metal shield member carried in said chamber and located in substantially spaced relation with respect to said wheel mounting face and said radially extending inner surface of said flange recess, said bolts engaging with said shield member to secure same in fixed position relative to said shaft flange, said shield member having an axially extending portion positioned closely alongside the head of each bolt and coacting therewith to prevent rotation of said bolts and thereby prevent disengagement of same from said hub flange shoulder.

13. A turbine assembly comprising a shaft having a wheel pilot recess and a turbine wheel having a mounting face adapted to be secured to the end of said shaft, said wheel having a hub piloted in the wheel pilot recess of said shaft, said shaft end having a substantially radially extending flange provided with an axial flange recess and a relatively thin peripheral wall extending axially and located radially outwardly from said flange recess, said flange having a radially extending end surface facing said wheel and bounding the radially extending inner end of said recess said wall having an annular rim adapted to abut said wheel mounting face, said wheel hub constructed and arranged to axially extend into said flange recess and provided with an outwardly radially extending flange having an annular circumferential shoulder facing and axially spaced from said wheel mounting face, said hub being substantially inwardly radially spaced from said thin peripheral flange wall and said mounting face being axially spaced from the radially extending inner surface of said flange recess to provide an annular air chamber, and mounting means carried by said flange and comprising a plurality of annularly spaced bolts extending through the flange and into the chamber, the heads of said bolts being engaged with said hub flange shoulder, and nuts disposed on said bolts exteriorly of said flange recess and arranged to engage with said flange and be tightened thereon for pulling said wheel mounting face against the annular peripheral rim of said flange wall and thereby spacing said wheel mounting face from the inner surface of said flange recess, a relatively thin substantially radially extending sheet metal shield member carried in said chamber and substantially spaced from said wheel mounting face and from the radially extending inner surface of said flange recess, said bolts engaging with said shield member to secure same in fixed position relative to said shaft flange, said shield member coacting with said bolts to lock same against rotation and thereby prevent disengagement of same from said hub flange shoulder, said shield member being concentrically mounted on said wheel hub, and said bolt heads being axially spaced from said wheel mounting face to minimize heat transfer between said shaft and said wheel.

References Cited in the file of this patent
UNITED STATES PATENTS

| | | |
|---|---|---|
| 2,117,131 | Auger | May 10, 1938 |
| 2,614,799 | Judson | Oct. 21, 1952 |
| 2,623,727 | McLeod | Dec. 30, 1952 |
| 2,662,725 | McVeigh | Dec. 15, 1953 |
| 2,684,831 | Grantham | July 27, 1954 |

FOREIGN PATENTS

| | | |
|---|---|---|
| 617,472 | Great Britain | Feb. 7, 1949 |
| 667,643 | Great Britain | Mar. 5, 1952 |
| 943,193 | France | Oct. 4, 1948 |